United States Patent [19]

Efron et al.

[11] Patent Number: 4,828,368
[45] Date of Patent: May 9, 1989

[54] NEAR BANDGAP RADIATION MODULATION SPATIAL LIGHT MODULATORS

[75] Inventors: Uzi Efron; Jan Grinberg, both of Los Angeles, Calif.

[73] Assignee: Hughes Aircraft Company, Los Angeles, Calif.

[21] Appl. No.: 880,217

[22] Filed: Jun. 30, 1986

[51] Int. Cl.$^4$ .............................................. G02F 1/01
[52] U.S. Cl. ..................................... 350/355; 350/356
[58] Field of Search ....................... 350/355, 356, 393; 332/7.51; 357/19, 4

[56] References Cited

U.S. PATENT DOCUMENTS

| | | | |
|---|---|---|---|
| 3,769,512 | 10/1973 | Grenot et al. | 350/393 X |
| 4,525,687 | 6/1985 | Chemla et al. | 332/7.51 |
| 4,528,464 | 7/1985 | Chemla et al. | 307/425 |
| 4,546,244 | 10/1985 | Miller | 372/12 X |
| 4,549,788 | 10/1985 | Chemla | 350/354 |
| 4,566,935 | 1/1986 | Hornbeck | 150/626 |

FOREIGN PATENT DOCUMENTS 0155802  9/1985  European Pat. Off. .
8493397  8/1984  PCT Int'l Appl. .

OTHER PUBLICATIONS

U. Efron et al, "Liquid-Crystal-Based Visible-to-Infrared Dynamic Image Converter", Optical Engineering, vol. 24, No. 1, Jan./Feb., 1985, pp. 111–118.
Ira Deyhimy et al, "GaAs and Related Heterojunction Charge-Couple Devices, IEEE Transaction on Electron Devices", vol. ED-27, No. 6, Jun. 1980, pp. 1172–1180.
B. A. Vojak et al, "A Self-Aligned Dual-Grating GaAs Permeable Base Transistor", IEEE Electron Device Letters, vol. EDL-5, No. 7, Jul. 1984, pp. 270–272.
I. Deyhimy, et al, "GaAs Charge-Coupled Devices", Appl. Phys. Lett. 32(6, Mar. 15, 1978), pp. 383–385.
Kingston et al, "An Electroabsorptive CCD Spatial Light Modulator", SPIE, vol. 465, 1984, pp. 9–11.
Ploog, Klaus et al, "Compositional and Doping Superlattices in III-V Semiconductors", Advances in Physics, (1983), vol. 32, No. 3, 285–359.
Y. B. Bolkhovityanov et al, "Growth Peculiarities of Graded Band Gap GaAsSb/GaAs Heterostructures and Effective Light Modulation in the 1.06 $\mu$m, Wavelength Region", Phys. Stat. Sol. (a), 78, 343–347 (1983).
U. Efron et al, "The Silicon Liquid-Crystal Light Valve", J. Appl. Phys. 57 (4), Feb. 15, 1985, pp. 1356 to 1368.
Goodhue et al., "Quantum-Well Charge-Coupled Devices for Charge-Coupled Device-Addressed Multiple-Quantum-Well Spatial Light Modulators", J. Vac. Sci. Technol. B4(3), May/Jun. 1986, pp. 769–772.

(List continued on next page.)

Primary Examiner—Eugene R. Laroche
Assistant Examiner—Nathan W. McCutcheon
Attorney, Agent, or Firm—V. D. Duraiswamy; A. W. Karambelas

[57] ABSTRACT

A near bandgap radiation modulation spatial light modulator (NBRM SLM) using multiple quantum wells (MQWs) is disclosed. Generally, the MQW NBRM SLM of the present invention comprises a MQW optical modulator and driver means for driving the MQW optical modulator. The MQW NBRM SLMs of the present invention can be configured in a plurality of configurations. The driver and MQW optical modulator may be configured in hybrid or monolithic configurations. The MQW optical modulator can be operated in either transverse or longitudinal electric field modes. The MQW NBRM SLM structures can be operated using either electroabsorption or electrorefraction effects, and in transmissive or reflective modes. The structures are operable with different addressing and write-in mechanisms, including photoactivation and electronic addressing. Alternate embodiments have special features such as cascaded heterojunction MQWs and pixelized submicron metal mirror. The disclosed invention provides an improved, high speed, high resolution, semiconductor driver-compatible, spatial light modulator using multiple quantum wells.

19 Claims, 5 Drawing Sheets

OTHER PUBLICATIONS

Burke et al, "CCD Spatial Light Modulators Using Electroabsorption Effects in Multiple Quantum Wells", SPIE, Jan. 1986.

R. H. Kingston et al, "Spatial Light Modulation Using Electroabsorption in a GaAs Charge-Coupled Device", Applied Physics Lett., vol. 41, No. 5, Sep. 1, 1982, pp. 413–415.

D. S. Chemla et al, "Electroabsorption by Stark Effect on Room-Temperature Excitons in GaAs/GalAs Multiple Quantum Well Structures", Appl. Phys. Lett. 42 (10), May. 15, 1983, pp. 864–866.

U. Efron et al, "Silicon Liquid Crystal Light Valves: Status and Issues", Optical Engineering, vol. 22, No. 6, Nov/Dec. 1983 (Bellingham, Washington US), pp. 682–686.

Haas, Werner E., "New Family of Optically Addressed Light Valves", 1976 Biennial Display Conference, New York, Oct. 1976.

John Mason, "Ceramic Image Devices Store High Resolution Pictures", *Electronic Design*, Mar. 2, 1972.

FIG. 4
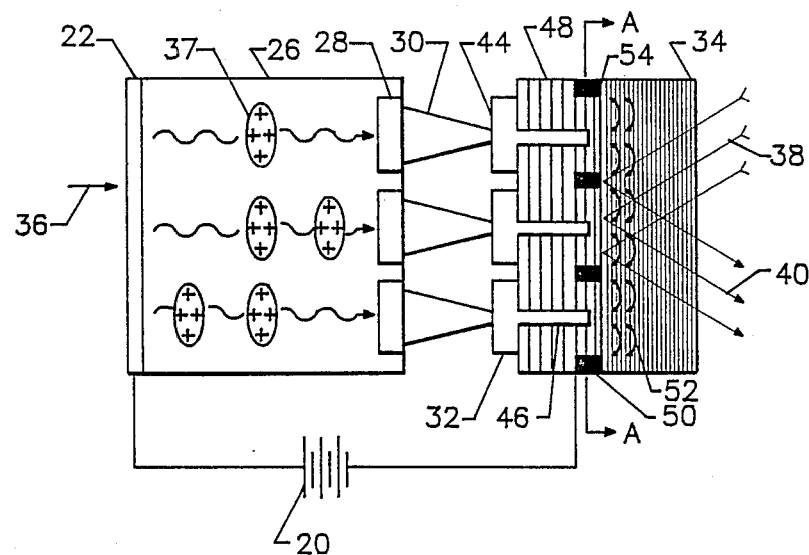
FIG. 5
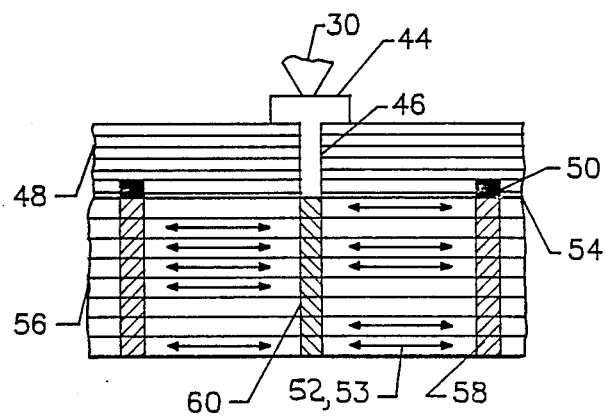
FIG. 6(A-A)
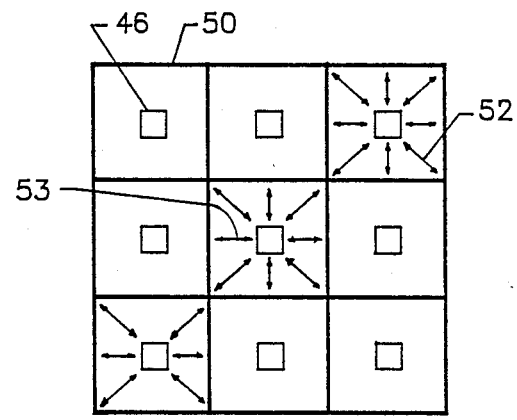

FIG. 12
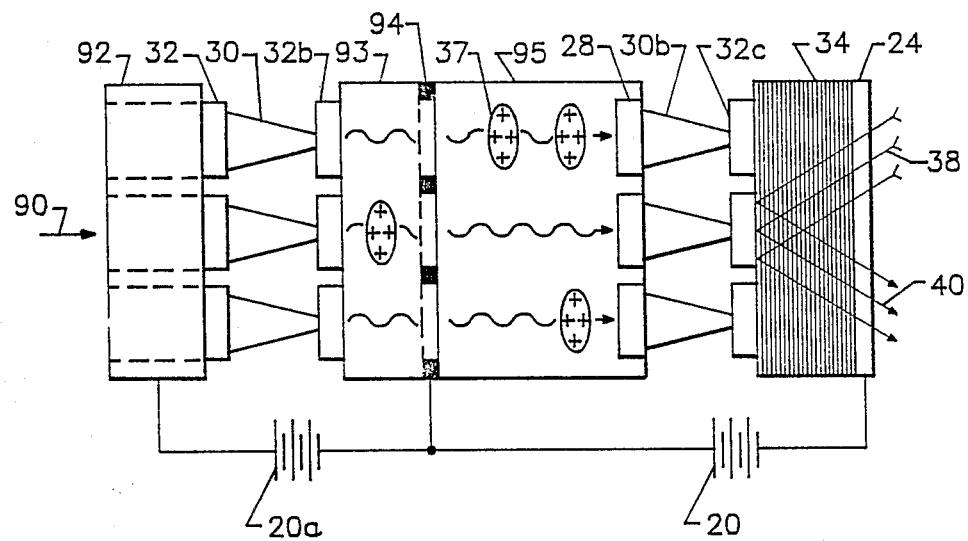
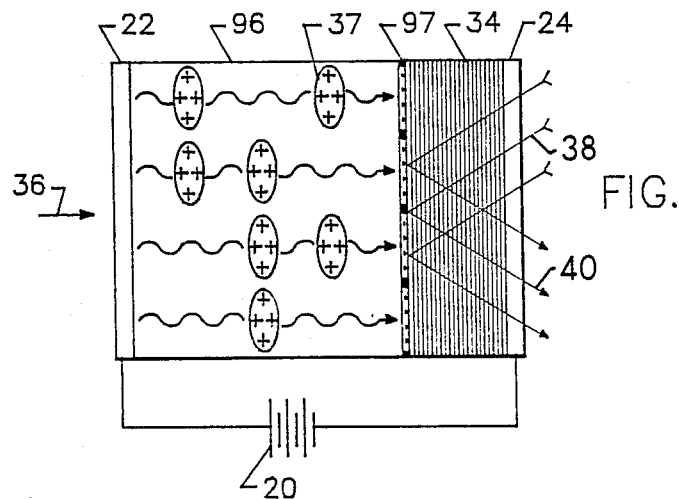
FIG. 13
FIG. 14
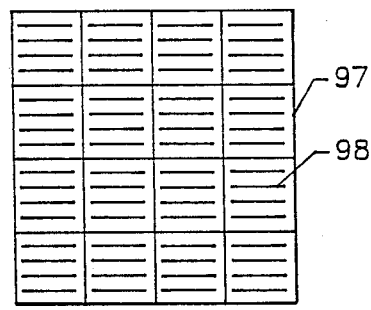

NEAR BANDGAP RADIATION MODULATION SPATIAL LIGHT MODULATORS

BACKGROUND

1. Field of Invention

The present invention relates to optical processing systems and electrooptic spatial light modulators. More specifically, the present invention relates to near bandgap radiation based spatial light modulators using multiple quantum wells.

2. Background Art

Several types of spatial light modulators are now commercially available. A spatial light modulator (SLM) is an optical device which modulates an illuminating readout beam in at least one spatial dimension. Currently available SLMs suffer from one or more deficiencies in terms of their performance or practical usage. In particular, relatively fast response modulators such as General Electric's Oil Film Device or Sodern's KDP-based modulator have relatively low optical resolution and require large driving systems. Typically, electrical circuitry is used to drive and activate an optical modulator which, in turn, modulates an illuminating readout beam. The low resolution of these high speed spatial light modulators is due to a CRT or other high voltage adressing means and their write-in mechanisms.

Another class of spatial light modulators includes liquid crystal light valves (LCLVs). LCLVs do not require large driving systems and have high optical resolution. LCLV SLMs typically have semiconductor drivers for suitably driving the liquid crystal optical modulator. One commercially available LCLV SLM is the Hughes Aircraft CdS-based photoactivated liquid crystal light valve. Two other LCLV SLMs have been developed using either photoactivated Silicon or electronically addressed charge coupled device write-in mechanisms. Both of these SLMs demonstrate very high performance in terms of high optical resolution and dynamic range, but have relatively slow response which limits two dimensional frame rates to 100 Hz. Another disadvantage of these LCLV SLMs is their inability to operate at low temperatures, for example below 273 degrees kelvin. Satisfactory low temperature operation is required for some applications, such as infrared to visible image conversion used in certain optical processing systems. These two LCLV SLMs are now briefly described as background information.

The Photoactivated Silicon LCLV SLM

A photoactivated Silicon LCLV SLM comprises a high resistivity Silicon photoconductor for receiving a photoactivating illuminating beam, a dielectric mirror with multiple layers for reflection and a liquid crystal layer functioning as the electrooptic modulator, all of which are integrably connected together in series. The liquid crystal layer is herein referred to as the "liquid crystal modulator". An asymmetrical AC voltage waveform is applied across the photoactivated Silicon LCLV SLM for supplying a modulated voltage signal having a high duty cycle. When zero or low level photoactivating illumination is incident on the Silicon photoconductor, most of the voltage is dropped across the Silicon photoconductor and the liquid crystal in not activated. An illuminating readout beam is modulated by the liquid crystal modulator as this readout beam passes through the liquid crystal. This illuminating readout beam is reflected by the dielectric mirror and then modulated still further by the liquid crystal modulator during a second pass through it after reflection. The illuminating readout beam passing through inactivated areas of the liquid crystal layer is left unmodulated, resulting in a low level output as an "off state" of the modulated readout beam. When photoactivating illumination is incident at a point on the photoconductor, the photoconductor becomes conductive, and, as a result of the voltage biasing, the voltage drop will be transferred to and activate a corresponding point in the liquid crystal modulator. The liquid crystal will then modulate the reflected readout beam, resulting in an "on state" output level which is proportional to the intensity of the input photoactivating illumination.

During use, the Silicon photoconductor is biased into deep depletion by the voltage source, thereby enabling an impedance match to be achieved between the photoconductor and the high resistivity of the liquid crystal layer. The AC voltage waveform provides for periodic depletion and accumulation phases per cycle. In a depletion active phase, the high resistivity Silicon photoconductor is completely depleted and electron hole pairs generated by the photoactivating illumination are swept away by a resulting electric field of the AC voltage waveform, thereby producing a signal current that activates the liquid crystal layer at particular points. Signal electron charge packets residing at the $Si/SiO_2$ dielectric mirror and photoconductor interface are periodically recombined by pulsing the photoconductor into a short accumulation phase of the AC voltage waveform.

An input electrode comprising a fiber optic faceplate coated with an Indium Tin Oxide conductive layer, is deposited on a front glass electrode abutting the Silicon photoconductor. The spatial resolution of the input illuminating image across the Silicon photoconductor is retained by a pixelizing means comprising a phosphorus implanted microdiode array abutting the $Si/SiO_2$ dielectric mirror and photoconductor interface. The microdiode array acts to focus the incoming electron charge packets into the resolved pixel cells defined by the microdiode array. This prevents lateral "spill-over" and subsequent smearing of the charge packet pattern.

The illuminating readout beam is reflected through the liquid crystal by means of the dielectric mirror. The dielectric mirror is a multilayer of alternating $Si/SiO_2$ layers providing high broadband reflectivity as well as optical isolation of the photoconductor from the high intensity illuminating readout beam. A thin layer of fast response, positive anisotropy, liquid crystal with a forty five degree twist angle is employed as the electrooptical modulator. When the liquid crystal layer is activated by a sufficient charge packet current signal, the optical polarization vector of the incident light is rotated in direct proportion to the degree of local electrical activation. Thus, a spatially resolved pattern of polarized modulation is introduced onto the reflected readout beam.

The Charged Coupled Device LCLV SLM

A charge coupled device (CCD) LCLV SLM comprises a CCD array for storing image information, a CCD read out structure, a dielectric mirror for reflection and a liquid crystal functioning as the electrooptic modulator. A bias voltage establishes a voltage potential gradient through the SLM and provides a modulated voltage waveform for the conduction of the charge packets.

CCD array registers convert serially coded image data into a two dimensional frame of image information which is stored as charge packets in the CCD array. Initially, one line of information is loaded into a CCD serial input register. When this input register is fully loaded, the information is transferred in parallel to a CCD parallel array. Then the input register is again filled with new information. Then the register is again transferred in parallel to the CCD parallel array. This sequence is repeated until the parallel CCD array contains an entire frame of information. At this point, the whole frame is transferred simultaneously towards the liquid crystal layer as a spatially resolved pattern of charge packets.

The spatial pattern of electron charge packets from the CCD array diffusses through a thin epitaxial layer to a high resistivity portion of CCD read out structure, and is subsequently collected by an electric field in a space charge region of the fully depleted CCD read out structure. The spatial pattern of electron charge packets are stored in the CCD read out structure while a new frame of information is loaded into the CCD array.

Optical readout from this device is accomplished by passing a polarized light illuminating readout beam through the transparent Indium Tin Oxide electrode abutting the Liquid crystal layer. The illuminating readout beam is then reflected by the dielectric mirror and reflected back through the liquid crystal layer as a reflected modulated readout beam. The activation of the liquid crystal by the spatial pattern of charge packets is performed exactly as in the photoactivated Silicon LCLV described above.

The CCD LCLV SLM temporarily stores two full-frame of information with one stored in the CCD array and the other in the CCD read out structure. This two full-frame storage enables the the CCD array to convert the serial incoming information to a parallel form for subsequent transfer as a whole frame while the readout structure conducts a full-frame of spatially resolved patterns of charge packets for biasing the liquid crystal modulator.

In both of these examples of LCLV SLMs, spatial charge patterns from the write-in mechanism selectively activate points within liquid crystal layer for modulated reflection of the readout beam. These LCLV SLMs have high resolution and are driven by semiconductor drivers. However, both suffer from inherently low speed and are inoperative at low temperatures. In some optical processing systems there exists a need for SLMs capable of operation at low temperatures with high resolution and semiconductor compatibility, and operation at high speed in order to fully benefit from the parallel processing capabilities offered by semiconductor electronic circuitry and parallel configured SLMs.

From the general considerations above, it follows that a need exists for a spatial light modulator that will feature a large electrooptic coefficient for high contrast and high resolution and be driven by relatively low voltages compatible with conventional semiconductor drivers and that will be driven at a fast speed at low temperatures. For further understanding of the LCLV SLM, see "The Silicon Liquid Crystal Light Valve", Uzi Efron et. al., J. Appl. Phys. 57 (4), Feb. 15, 1985, which is herein incorporated by reference.

Near Bandgap Radiation Based SLM

The general concept of near bandgap radiation modulation (NBRM) is that the electrooptical properties of certain semiconductors, when activated by illuminating radiation at energy (wavelength) levels near the bandgap of the semiconductor, will exhibit large changes under the influence of even a small change in an electric field. This produces significant modulation of the illuminating radiation passing through the semiconductor. The modulation may be monitored or measured. Any variation in the band structure or in the population of energy levels near the bandgap edge of the semiconductor will result in a significant change in the electrooptical properties relative to a given radiation energy level.

Applied electrical fields are capable of varying the electrooptical properties of the semiconductor given a particular level of radiation, and thus are capable of modulating the intensity or phase of a readout beam. The modulation of the absorption coefficient (electroabsorption) or refractive index (electrorefraction) may be accomplished by applying a relatively low electric field, e.g. 10 kv/cm, to an electrooptical modulator.

A recent near bandgap radiation modulation (NBRM) SLM has incorporated the effect of electroabsorption or the Franz-Keldysh effect, in a buried channel GaAs CCD. GaAs and all direct gap semiconductors exhibit strong dependent electroabsorption, i.e. a large increase of optical absorption with applied electrical fields. This NBRM SLM operates in a transmissive-mode by receiving near bandgap radiation illumination and transmitting that illuminating radiation through the modulator.

This NBRM CCD SLM has an electrically addressed CCD (EACCD) as its write-in mechanism. This Transmissive-mode NBRM EACCD SLM receives near bandgap radiation illumination normal to the surface of a CCD which illumination is passed through semitransparent Schottky barrier gates of the CCD to the N+ type GaAs buried channel and then transmitted through a semiinsulating GaAs substrate as an intensity modulated transmitted readout beam.

The modulation efficiency based on electroabsorption in the GaAs buried channel and the electric field distribution in the GaAs buried channel was determined. For a channel with uniform N type doping density formed on a semiinsulating substrate, the field falls off linearly with depth in the channel. For an empty well with no charge packet, the field becomes zero at the interface between the N type layer and the substrate. The channel voltage, i.e. the drop in electron potential from the CCD gate to the free-electron region as well as the electric field, decreased to zero as the well was filled. The results were viewed as a relationship between the extent of transmission (electroabsorption) versus channel voltage (the applied electric field).

The incident illuminating radiation light produced extra electrons in the buried channel and it is this electron production which limits the input light intensity and consequently the dynamic range, since the desired signal pattern may be "bleached" at high light levels. Hence, this device suffers from a poor dynamic range of the photoactivating illuminating radiation. Also, very weak modulation of the transmitted modulated readout beam will result because the thick substrate exhibits strong absorption due to band-edge "tailing". For further understanding of this NBRM SLM see "Spatial Light Modulation Using Electroabsorption in a GaAs Charge Coupled Device", R. H. Kingston et. al., Appl. Phys. Lett. Vol. 41, No. 5, Sept. 1, 1982, which is herein incorporated by reference.

The NBRM SLM discussed above uses a one dimensional CCD array and has the following drawbacks: (a) limitation of the dynamic range by substrate activation due to absorption, this results in low modulation levels; (b) limitation of the dynamic range due to the use of a relatively low-efficiency electroabsorber (GaAs); this results in low modulation levels; and (c) one dimensionality of the modulator used.

Multiple Quantum Wells

Multiple quantum wells (MQWs) are alternating layers of semiconductor materials having thickness near the DeBroglie wavelength of the electrons confined within the MQWs. It has been observed that a MQW of alternating GaAs/GaAlAs layers produces a large change in optical absorption for a small applied electric field. Because of the confinement of carriers in the thin layers of the MQW, exciton density of states increase because of an increased binding energy which is caused by the confinement. This increase in exciton density of states produces an increased rate of change in the optical absorption coefficient of the MQW. This increased rate of change in the optical absorption coefficient at the radiation energy level of an illuminating readout beam enhances modulation of the readout beam when an electric field is applied.

Using the Franz-Keldysh or the electroabsorption effect, illuminating radiation can be significantly modulated near the bandgap edge. The electroabsorption, i.e. the large increase of optical absorption with applied electrical fields, is used to modulate an illuminating readout beam which is transmitted or reflected forming the modulated readout beam. Hence, the MQW structure enhances modulation and improves the efficiency of the optical modulation.

From the Kramers-Kronig relations it is known that the refractive index will exhibit high dispersion around the peak absorption point. Likewise, the refractive index can be modulated by applied electric fields for producing a modulated readout beam; this modulation is further enhanced by using the MQW structure. For further understanding of the MQW see: (a) "Electroabsorption by Stark Effect on Room-Temperature Excitons in GaAs/GaAlAs Multiple Quantum Well Structures", D. S. Chemla et. al., Appl. Phys. Lett. 42 (10), May 15, 1983; and (b) U.S. Pat. No. 4,525,687, "High Speed Light Modulator Using Multiple Quantum Well Structures", Chemla et al., issued June 25, 1985, both of which are herein incorporated by reference.

The enhanced modulation level provided by the MQWs has not been applied to spatial light modulators prior to the present invention. Many of the above mentioned problems and disadvantages relating to the SLMs are solved or reduced using MQW based NBRM SLMs.

SUMMARY OF THE INVENTION

The present invention provides a new class of spatial light modulators utilizing multiple quantum wells (MQWs) and near bandgap radiation modulation for spatial light modulation. The invention allows adequate optical modulation levels of solid state materials to be attained with low applied voltages and correspondingly low applied electric fields modulating a MQW optical modulator. These new MQW-based NBRM SLMs are fabricated using hybrid or monolithic semiconductor process technologies, and operated in either longitudinal or transverse field modes, using modulated electroabsorption or modulated electrorefraction, in transmissive or reflective modes, and under forward or reverse modulation, with various write-in mechanisms supporting many different optical processing applications.

Generally, the NBRM SLM of the present invention has an optical modulator which comprises a MQW with enhanced optical modulation characteristics. The MQW optical modulator is driven by a semiconductor driver made of conventional semiconductor materials and operated at relatively low semiconductor compatible voltage and current levels. The semiconductor driver and the MQW optical modulator are fabricated by various semiconductor processes to form a plurality of configurations operated in a plurality of modes for supporting a wide variety of optical processing applications.

One particular embodiment of the present invention employs the NBRM SLM using the multiple quantum wells with a biased pixelizing metallic grid in combination with contact bumps conducting charge packets, both of which enable transverse-field-mode modulation based on transverse electrical fields penetrating into and modulating optical properties of the MQW. Another embodiment employs MQWs made of special cascaded PN-PN diodes arrangements for enhanced transverse-field-mode modulation in combination with the metallic grid and contact bumps.

A second embodiment of the present invention includes an electrically addressed charge coupled device (EACCD) NBRM SLM with a submicron metal mirror which enables a GaAs/GaAlAs based MQW to be grown on a GaAs substrate in a monolithic structure while reflecting an illuminating readout beam. Another embodiment provides for an EACCD NBRM SLM operated in an inverse modulation mode where the presence of charge packets produce a high intensity readout modulation of the readout beam, whereas, in contradistinction, in the forward modulation mode, the charge packets produce a low intensity readout modulation of the readout beam.

A further embodiment employs a photoactivated monolithic NBRM SLM having a pixelized submicron metal mirror for reflecting the illuminating readout beam which mirror also pixelizes the charge packets generated by a photoactivating illuminating beam.

The herein disclosed MQW based NBRM SLMs are characterized by low temperature operation, fast response time, large dynamic range and semiconductor voltage and material compatibility for both electroabsorption and electrorefraction modulation. The modulation of the electroabsorption or the electrorefraction is by virtue of the MQW designs providing a steeper bandgap edge resulting in enhanced modulation of the reflected or transmitted modulated readout beam. The MQW structures have bandgap edges which are significantly steeper than in bulk material due to enhanced excitonic lines and the two dimensional behavior of the density of states which behaves as a step function.

The modulation of the absorption coefficient or the refractive index of the NBRM SLM optical modulator is accomplished by applied electric fields which correspond to a few tenths of a volt and which activate the MQW optical modulator having approximately a five micron thickness. Modulation of the refractive index is now utilized in NBRM SLMs, and this modulation avoids the need for modulated electroabsorption in certain applications where high electroabsorption limits the dynamic range of the optical modulator. The present invention discloses NBRM SLMs characterized by high speed, low temperature operation, high dynamic range, high resolution, variable configurations and semiconductor compatible optical modulators.

The present invention provides an improved, high speed, high resolution, low operating temperature, and semiconductor driver-compatible spatial light modulator (SLM) using multiple quantum wells (MQWs).

Another advantage of the present invention is that it provides a near bandgap radiation modulation (NBRM) SLM, with a high dynamic operating range, with improved modulation levels and with low substrate absorption.

A further advantage of the present invention is that it provides a NBRM SLM with a high dynamic operating range, with improved modulation levels, and with high efficiency electroabsorption.

Yet another advantage of the present invention is that it to provides an improved high speed, high resolution, low operating temperature, and semiconductor driver-compatible NBRM SLM which enables modulated electroabsorption.

Still another advantage of the present invention is that it provides an improved high speed, high resolution, low operating temperature, and semiconductor driver-compatible NBRM SLM which enables modulated electrorefraction.

Yet a further advantage of the present invention is that it provides an improved high speed, high resolution, low operating temperature, and semiconductor driver-compatible NBRM SLM operated in a plurality of spatial dimensions.

These and other advantages will become more apparent in the following description of the preferred embodiments and the accompanying drawings.

BRIEF DESCRIPTION OF THE DRAWINGS

In the accompanying drawings:

FIG. 4 depicts a photoactivated reflective-mode hybrid transverse-field-mode NBRM SLM.

FIG. 5 is a detail sectional view of a cascaded heterojunction multiple quantum well with applied lateral transverse electric fields.

FIG. 6 is a detail sectional view of a metallic grid encompassing extended field bumps producing transverse electric fields in various orientations.

FIG. 12 depicts a infrared-photoactivated reflective-mode hybrid longitudinal-field-mode NBRM SLM.

FIG. 13 depicts a photoactivated reflective-mode monolithic longitudinal-field-mode NBRM SLM with a submicron metal pixelized mirror.

FIG. 14 is a detail view of the pixelized submicron metal mirror.

PREFERRED EMBODIMENTS

Figure 1:
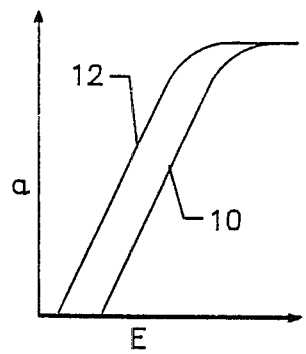
FIG. 1 is a graph depicting an absorption coefficient as a function of the photon energy with an applied electric field as a parameter.
Figure 2:
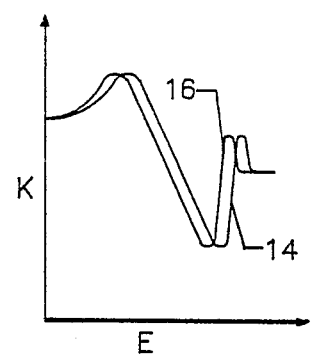
FIG. 2 is a graph depicting a refraction index as function of the photon energy with an applied electric field as a parameter.

Referring to FIGS. 1 and 2, an optical absorption coefficient (a) is a function of the radiation energy level (E) near the bandgap edge of an optical modulator and is characterized by a relatively high energy level rate of change. Without an applied electric field, the electroabsorption curve 10 defines a first bandgap edge. With an applied electric field, the electroabsorption curve 12 defines a second bandgap edge. If a particular level of radiation i.e. a particular wavelength illuminating radiation, is at a level between the two curves 10 and 12, then a small superimposed applied electric field can be used to modulate, that is significantly change, the electroabsorption of an optical modulator. The modulation of electroabsorption may be viewed as an intensity modulation of a modulated readout beam.

The refractive index (K) is also a function of the radiation energy level (E) near the bandgap edge of an optical modulator and is also characterized by a relatively high energy level rate of change at a particular illuminating radiation energy level. Without an applied electric field, the electrorefraction curve 14 relates to a first bandgap edge. With an applied electric field, the electrorefraction curve 16 relates to a second bandgap edge. The refractive index of an optical modulator for a particular wavelength illuminating radiation, can also be significantly modulated by a small applied electric field. The modulation of the electrorefraction then may be viewed as a phase shift modulation when a coherent wavefront radiates and illuminates the optical modulator modulating a readout beam.

Figure 3:
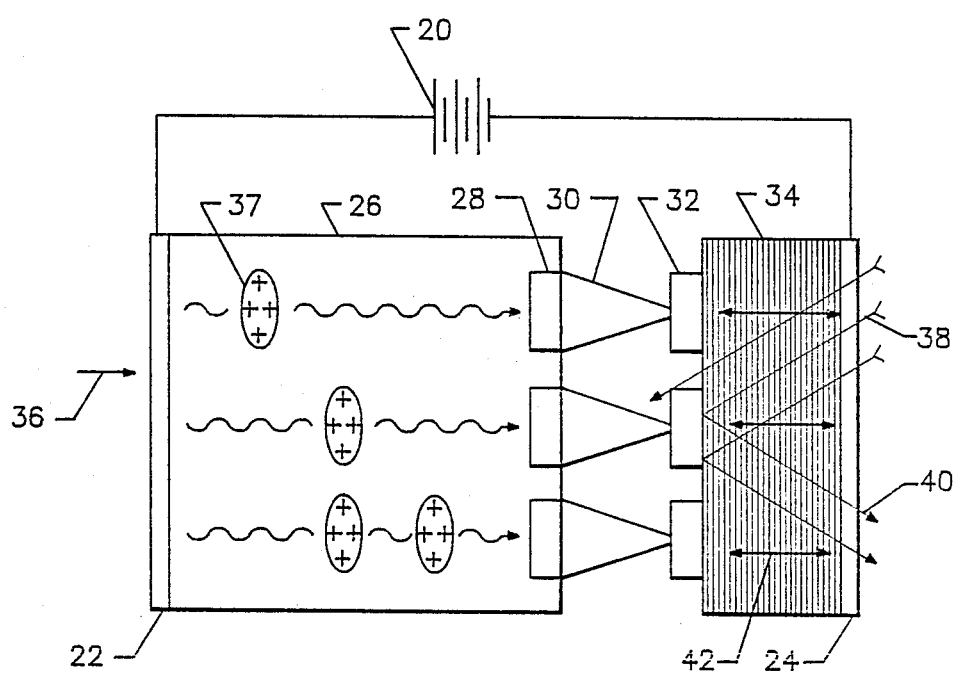
FIG. 3 depicts a reflective-mode hybrid photoactivated longitudinal-field-mode near-bandgap-radiation-modulation (NBRM) spatial light modulator (SLM).

Referring to FIG. 3, which depicts a reflective-mode hybrid photoactivated longitudinal-field-mode near-bandgap-radiation-modulation (NBRM) spatial light modulator (SLM), a voltage source 20, for example 100 volts, is connected between a receiving transparent 500 angstrom conducting Indium-Tin-Oxide electrode 22 and a transmitting transparent 500 angstrom conducting Indium-Tin-Oxide electrode 24 for establishing a voltage potential gradient and a corresponding electric field therebetween. The electrode 22 is integrably formed on a fifty to one hundred micron high-resistivity Silicon photoconductor 26 which is deeply depleted during use and which conducts electron and holes charges created by photoactivation. Alternatively, using a Silicon on Sapphire technology, a thin epitaxial layer (not shown) of medium resistivity Silicon, e.g. one hundred ohms per centimeter, can be used instead of the Silicon photoconductor 26. The photoconductor 26 has 1000 angstrom Schottky barrier contacts 28 which may be made of Platinum, Tungsten or other like metal. Alternatively, the Schottky barrier contacts 28 can be replaced by PN diodes formed by implanting or diffusing dopants of opposite type to that of the photoconductor 26.

Cone shaped Indium bumps 30 are formed on the Schottky contacts 28 and extend therefrom. The Indium bumps 30 abut against and make electrical contact with metal contact pads 32 which again may be either Platinum, Titanium or other like metal. The contact pads 32 are integrably formed on a multiple quantum well (MQW) 34 which comprises either compositional or doping modulated layers. The MQW 34 is typically made of 200 alternating pairs of modulated layers for a total MQW thickness of approximately two to five microns. The MQW 34 has thin alternating layers which have a thickness comparable in quantum proportion to the electronic DeBroglies' wavelength of the electrons confined in the layers of the MQW 34.

In the MQW 34, the bandgap edges are significantly steeper than in bulk material due to (a) enhanced excitonic lines and (b) the two-dimensional behavior of the density of state which behaves as a step-function. The modulated structures of the MQW 34 offer the advantages of steep excitonic lines or steep bandgap edges for both intensity (electroabsorption) or phase (electrorefraction) modulation. Typical examples of this class include GaAs/GaAlAs for wavelengths approximately equal to 0.8 microns, and AlGaAs/InGaAs for wavelengths approximately equal to 0.9 to 1.9 microns. Wide bandgap materials such as ZnSe/ZnMnSe offer operational wavelengths in the blue-green region at 0.4–0.6 microns as well as higher excitonic lines obtained with the higher binding energy. Additionally, a reduced self-photoconductivity effect results from the excitonic energy being further away from the conduction band. Thus, excitons generated during the absorption process will have less tendency to decay into the conduction band for enhanced modulation.

In operation, a photoactivating illuminating beam 36 incident to the electrode 22 penetrates the electrode 22 and produces hole-electron pairs of which positive hole charged packets 37 conduct, that is, drift through the photoconductor 26 towards the MQW 34. The photoactivating illuminating beam 36 has an intensity level, typically at a few milliwatts per square centimeter, sufficiently energy-intense to create the electron-hole pairs as a two dimensional spatial image within the photoconductor 26. The electron-hole pairs drift through the photoconductor 26 as a continuous current flux which is represented in all the FIGURES as pixelized discrete charge packets 37 but may actually be an analog varying current flux throughout the photoconductor 26, which current flux is subject to lateral smearing as it drifts longitudinally through the photoconductor 26.

The Schottky contacts 28 provide a reverse bias junction allowing small reverse bias leakage current in the order of one-tenth microamperes per square centimeter as a dark current level that is, a zero photoactivating illuminating level of the photoactivating illuminating beam 36. The placement of the Schottky contacts 28, usually in a rectangular grid, help pixelize the charged packets 37 to discrete pixel areas defined by the Indium bumps 30.

The voltage source 20 establishes a voltage potential gradient longitudinally through the SLM, and produces the deep depletion of carriers in the photoconductor 26. The deep depletion of the photoconductor 26 by the voltage source 20 allows the necessary impedance match with the optical modulator, that is the MQW 34, to be achieved so that under dark conditions (no input photoactivating illumination) most of the voltage and the corresponding electric fields will be dropped across the photoconductor 26.

Importantly, the deep depletion of the photoconductor 26 also enables the spatial resolution of charged packets 37 to be maintained as discrete charged packets 37 which drift under the depletion field with minimal lateral spreading which tends to smear the spatial image. Alternatively, using the Silicon on Sapphire technology, an epitaxial Silicon layer replacing the photoconductor 26, can be used having a reduced thickness of a few microns. In this case, full depletion of the epitaxial layer is not required because lateral charge diffusion is inherently reduced.

As the charge packets 37 drift through the photoconductor 26, an increased voltage and corresponding longitudinal electric fields 42 develop through the MQW 34 resulting in optical modulation of an illuminating readout beam 38 which is then reflected as a modulated readout beam 40. This modulation of the illuminating readout beam 38 is doubled by virtue of the readout beam 38 and 40 firstly entering and passing through the MQW 34 and secondly being reflected and again passing through the MQW 34 as a modulated readout beam 40. During both passes, the modulation effect caused by the induced longitudinal electric fields 42 produce a particular level of modulation of the readout beam 38 and 40.

The illuminating readout beam 38 should have a wavelength approximately equal to energy levels of the bandgap of the MQW 34. For applications permitting low readout light levels, for example, less than 100 microwatts per square centimeter, the electroabsorption affect can be used because the electrical activation, that is the voltage drop caused by the absorption in the modulator, is low. For high readout levels, the electrorefraction effect should be used. The refractive index modulation will result in a phase modulation which can be converted to intensity modulation or directly used for adaptive optic applications.

It should now become apparent that the NBRM SLM of FIG. 3 creates longitudinal electric fields 42 within the MQW 34. The term "longitudinal electric fields" is used herein to describe electric fields which are parallel to the direction of the illuminating beam 36. The application of these electric fields affects the bandgap edge so as to modulate the absorption or refraction of the readout beams 38 and 40. The charge packets 37 in a planar cross sectional view of the photoconductor 26 represents a two dimensional image in both of the vertical and horizontal directions at a given point in time. Though the exemplar preferred embodiment of FIG. 3 employs a two dimensional spatial light modulation, a one dimension spatial light modulation can equally be used. The photoconductor 26 can be made narrow, or there can be other like modifications to the SLM such that only a line of charge packets 37 forms a one dimensional image using one dimensional spatial light modulation.

Referring to FIG. 4, which depicts a photoactivated reflective-mode hybrid transverse-field-mode NBRM SLM, the SLM driver comprises the electrode 22, the photoconductor 26, the Schottky contacts 28 and the Indium bumps 30 integrably formed and operated as is the driver of the SLM depicted in FIG. 3. The Indium bumps 30 make electrical contact with nail shaped contact pads 44 having a 1000 angstrom metal contact pads 32 and having extending bumps 46 both of which are made of Platinum, Tungsten or other like metal and which extend into a dielectric mirror 48.

The dielectric mirror 48 preferably comprises alternating layers of, for example, Si/SiO$_2$ or GaAlAs/GaAs layers each having a thickness approximately equal to one quarter of the wavelength of the illuminating readout beam 38. The dielectric mirror 48 has an enhanced refractive index with enhanced reflective characteristics. A preferable number of layers is ten pairs of alternating layers. Each of the layers are insulating providing high longitudinal impedance match. The layers also have high sheet resistance to prevent lateral conduction and smearing but have sufficient conductivity to allow the charge packets 37 to drift towards the MQW 34.

The extended bumps 46 provide localized voltage potential points for a well defined pixelized spatial image. A two to five micron wide line, on a half micron thick, twenty micron by twenty micron metallic grid 50, as shown in more detail in FIG. 6, is connected to a voltage source 20 supplying a reference voltage to the metallic grid 50. The pixelized charges on the extended bumps 46 induce extending transverse electric fields 52 extending across a dielectric mirror MQW interface 54 thereby coupling the extending transverse electric fields 52 into the MQW optical modulator 34, so as to cause either electroabsorption or electrorefraction modulation of the readout beams 38 and 40. The term "transverse electric fields" is used herein to describe electric fields orthogonal with respect to the direction of the illuminating beam 36.

Referring to FIGS. 4 and 6, the metallic grid 50 made of Gold, Platinum, Tungsten or other like metal is connected to the voltage source 20 such that extending transverse electric fields 52 extend into the MQW 34. Where the entire metallic grid 50 is connected to a voltage source 20, the extending transverse electric fields 52 also extend radially from the extended bumps 46 to the grid lines of the metallic grid 50, as more clearly shown in FIG. 6. The radially extending transverse electric fields 52 enables modulation of the electroabsorption of the MQW 34.

Referring to FIGS. 4 and 5, a cascaded heterojunction multiple quantum well 56 may also be used, in which MQW 56 there are alternating P type and N type doped GaAs layers. In such a case, the metallic grid 50 has metallic grid extended fused contacts 58 for carrying a negative voltage potential. The fused contacting material may be for example Zinc or Tin or other like material providing ohmic contact to P type layers and blocking contact to N type layers. Also, the extended bumps 46 have bump extended fused contacts 60 made preferably of Tin or other like metal providing a blocking contact to all the alternating P type and N type doped GaAs layers of the heterojunction MQW 56. This arrangement provides for high lateral transverse fields 53 to be attained in the layered MQW 56 with a relatively low current in spite of the large sheet conductivity of the layers.

The lateral transverse fields 52 extend between the extended bump extended fuse contact 60 and the metallic grid extended fused contact 58. For electroabsorption modulation, lateral (non-extending) radial electric fields may be used. For both electrorefraction and electroabsorption modulation, unidirectional lateral transverse electric fields 53 may be used.

Differing unidirectional lateral transverse electric fields 53 can be achieved as shown in FIG. 5 and 6. For example, if an applied voltage potential is connected to horizontal grid lines while the vertical grid lines are floating, then the lateral transverse electric fields 53 may extend substantially uniformly vertically rather than radially. Also, if the applied voltage potential is connected to vertical grid lines and the horizontal grid lines are floating, then the lateral transverse electric fields 53 may extend substantially uniformly horizontally rather than radially. FIG. 6 depicts these two different orientation of uniform lateral transverse electric fields 53. Thus, differing types of grid connection and layouts can create differing orientations of uniformly oriented or nonuniformly oriented lateral unidirectional or radially extending transverse electric fields 52, 53 within the MQW 34 or 56 for enhanced modulation.

Figure 7:
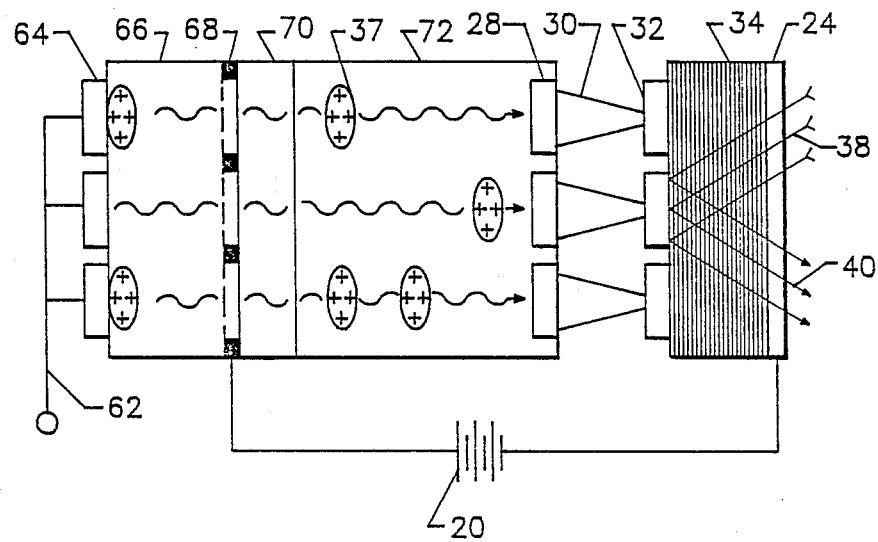
FIG. 7 depicts an electrically-addressed charge-coupled-device (EACCD) reflective-mode hybrid longitudinal-field-mode NBRM SLM.

Referring to FIG. 7 which depicts an electrically-addressed charged-coupled-device reflective-mode hybrid longitudinal-field-mode NBRM SLM, a CCD input terminal 62 provides an active minus 15 volt addressing signal and is connected to the plurality of three micron CCD gates 64 made of polysilicon and Silicon Dioxide which signal, is used to shift charge packets 37 in a three to five micron N type Silicon epitaxial surface channel layer 66. An N+ doped Silicon grid 68 is disposed between the channel layer 66 and an N+ type doped Silicon epitaxial layer 70. The epitaxial layer 70 is integrably formed upon a high resistivity Silicon semiconductor 72 which is deeply depleted during use. The Schottky contacts 28, Indium bumps 30, contact pads 32, MQW 34 and electrode 24 are similar to those of the SLM depicted in FIG. 3.

In operation, the CCD gates 64 form a spatial image of charge packets 37 by using electrical addressing circuits (not shown) as is well known in the art. The grid 68 serves to provide a bias voltage reference from the voltage source 20 so as to create the voltage potential gradient through the SLM and further serves to pixelize the charged packets 37 as the charged packets 37 move through the channel layer 66, the grid 68, the epitaxial layer 70 and the semiconductor 72 towards the Schottky contacts 28. As before, the Indium bumps 30 extend to contact pads 32 formed on top of the MQW 34 which serves to modulate the illuminating readout beam 38 producing a reflected modulated readout beam 40.

Figure 8:
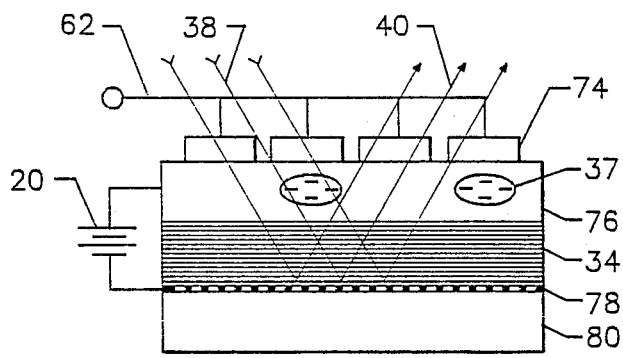
FIG. 8 depicts an EACCD reflective-mode monolithic longitudinal-field-mode NBRM SLM with a submicron metal mirror and operated an inverse modulation mode.

Referring to FIG. 8 which depicts an electrically-addressed CCD reflective-mode monolithic longitudinal-field-mode NBRM SLM, the SLM has semitransparent conductive electrode CCD gates 74 made of a conductive 500 angstrom Indium-Tin-Oxide transparent layer and a fifty angstrom Platinum, Tungsten or other like metal layer which forms Schottky contacts with the N type GaAs quasi buried layer 76. The CCD gates 74 are integrably formed on the GaAs layer 76 which in turn is formed on the MQW 34. The MQW 34 is overgrown on a submicron metal mirror 78 which is overgrown upon a GaAs substrate 80. The submicron metal mirror 78 is a reflecting metal grid having line periods of ¼ to 1/10 micron line spacing which allow the MQW structure 34 to be epitaxially overgrown on the GaAs substrate 80.

In operation, the submicron metal mirror 78 provides a reflective surface reflecting the illuminating readout beam 38 penetrating the transparent CCD Schottky gates 74. The voltage source 20, which in this embodiment is twenty volts, is connected between the submicron mirror 78 and the channel layer 76 and provides a voltage potential gradient between the CCD gate 74 and the mirror 78 through the MQW 34. The submicron metal mirror 78 may have periodic enlarged lines of one micron to insure complete conduction of the voltage potential equally about the submicron mirror 78 then producing a uniform voltage potential gradient through the MQW 34.

The CCD input terminal 62 is active at negative twenty volts for repelling negative charge packets 37. This, together with the similar repelling action of the submicron metal mirror 78 force the charge packets 37 to move through the buried channel 76. Charge packet shifting is achieved by forming lateral voltage gradients between the gates as is well known in the art.

The SLM of FIG. 8 operates in an inverse modulation mode in that the accumulation of negative charge packets 37 reduces the field applied to the MQW 34 layers and therefore reduces the optical modulation. The charged packets 37 under the semitransparent conductive electrode CCD 74 gates reduce the longitudinal electric fields which otherwise extend into the MQW structure 34 for inversely modulating the reflected readout beam 40.

For an N type MQW 34 such as GaAs/GaAlAs, the metal mirror 78 as well as the CCD Schottky CCD gates 74 will be negatively biased with a channel contact (not shown) at a ground potential except during the injection of signal charge packets 37 into the channel layer 76 by the channel contact. Following the clocking of the charge packets 37 into the CCD channel buried layer 76, that is the N type GaAs channel buried layer 76, a two-dimensional pattern of spatially resolved charge packets 37 is formed under the CCD gates 74. The modulated reflected readout beam 40 which is optimized at an energy (wavelength) level between the two bandgaps associated with the two materials which form the MQW 34, passes through the semitransparent CCD gates 74 and is reflected by the submicron metal mirror 78. The readout beam 40 is modulated by either the electroabsorption or the electrorefraction effect produced by the modulation of the electric fields induced by charged packets 37 in an inverse modulation mode.

An alternative approach to the configuration of FIG. 8 may be to firstly eliminate the submicron metal mirror 78 and secondly change the GaAs substrate 80 to an InP substrate which then forms a heterojunction with an N type MQW 34. In this case, the effective bandgap of the MQW 34 is lowered in comparison to the InP substrate, using, for example, alternate layers of InGaAs/InAlAs so as to render the InP substrate transparent. This SLM will then operate in a transmissive mode.

As yet another alternative approach, the buried channel 76 can be eliminated and replaced by the MQW 34 which then serves as both the optical modulator and the buried channel 76.

Figure 9:
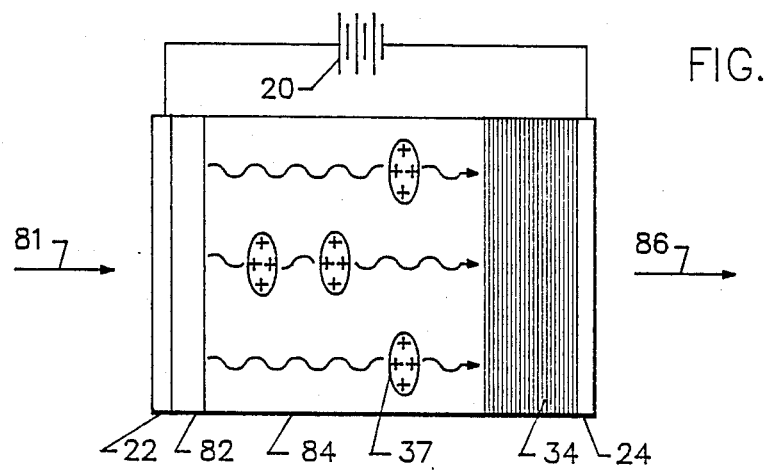
FIG. 9 depicts a photoactivated transmissive-mode monolithic longitudinal-field-mode NBRM SLM.

Referring to FIG. 9 which depicts a photoactivated transmissive-mode monolithic longitudinal-field-mode NBRM SLM, photoactivating illuminating and readout beam 81 which comprises a photoactivating illuminating beam and an readout beam 86 is transmitted through the SLM. A 100 angstrom semitransparent Schottky contact 82 provides for high resistivity of a semiinsulating GaAs photoconductor 84 by reverse bias operation. The photoactivating illuminating beam has a wavelength at a photon energy greater that the bandgap energy of the photoconductor 84, whereas the readout beam 86 has a wavelength at a photon energy lesser than the bandgap energy of the photoconductor 84. The semiinsulating GaAs photoconductor 84 is integrably disposed between the Schottky contact 82 and the MQW 34. The electrodes 22 and 24 are connected to the voltage source 20 establishing the voltage potential gradient through the SLM.

In operation, the photoconductor 84 is photoactivated and conducts the charge packets 37 forming a spatial image in the SLM. This SLM operates under transmissive mode for modulating a transmitted modulated readout beam 86.

Figure 10:
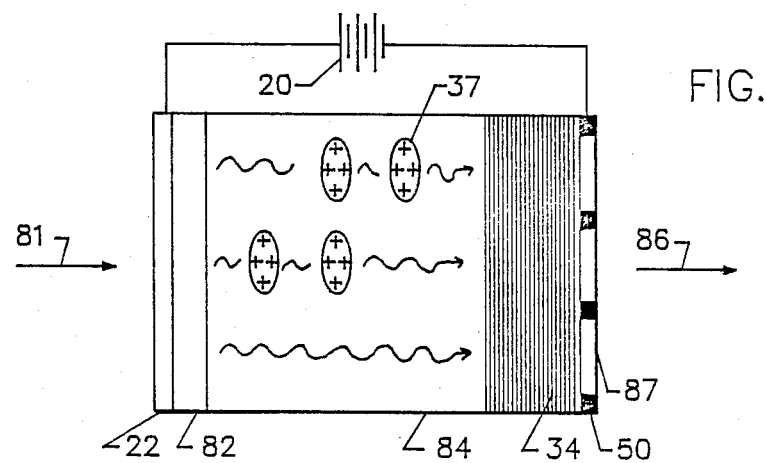
FIG. 10 depicts a photoactivated transmissive-mode monolithic transverse-field-mode NBRM SLM.

Referring to FIG. 10 which depicts a photoactivated transmissive-mode monolithic transverse-field-mode NBRM SLM, the metallic grid 50 replaces the electrode 24 of FIG. 9 and provides for traverse field mode operation in this SLM. The metallic grid 50 is disposed within a passivating Silicon Dioxide layer 87. The metallic grid 50 enables transverse field mode operation by inducing transverse electric fields between the grid 50 and the charge packets 37 as the charge packets 37 conduct through the MQW 34 in close proximity to the grid 50.

The photoactivating illuminating and readout beam 81 which again comprises a photoactivating illuminating beam and a readout beam 86 is transmitted through the SLM. Again, the photoactivating illuminating beam has a wavelength at a photon energy greater than the bandgap energy of the photoconductor 84, whereas the readout beam has a wavelength at a photon energy lesser than the bandgap energy of the photoconductor 84. In operation, the photoconductor 84 is photoactivated and conducts the charge packets 37 forming a spatial image in the SLM. This SLM operates under the transmissive mode for modulating the transmitted readout beam 86 which is modulated in the transverse field mode.

Figure 11:
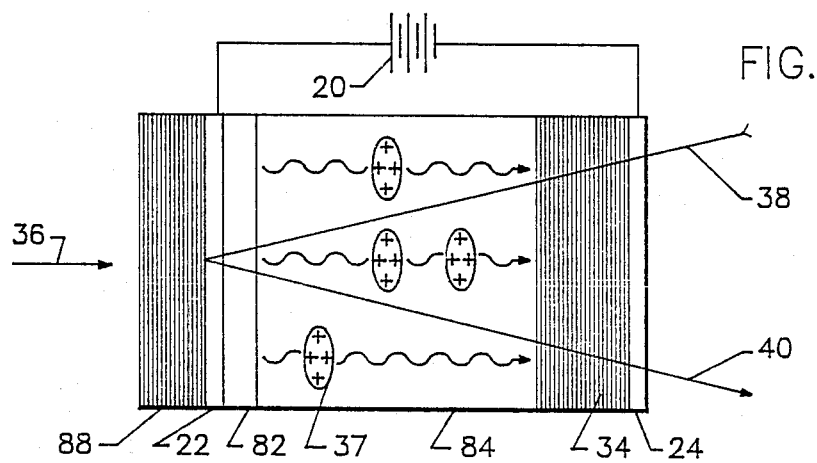
FIG. 11 depicts a photoactivated reflective-mode monolithic longitudinal-field-mode NBRM SLM.

Referring to FIG. 11 which depicts a photoactivated reflective-mode monolithic longitudinal-field-mode NBRM SLM, the SLM has the same structure as the SLM of FIG. 9 except that a dichroic mirror 88 is deposited on the input side of the device on electrode 22 for reflecting the illuminating readout beam 38. The photoactivating illuminating beam 36 has a wavelength at a photon energy greater than the bandgap energy of the photoconductor 84, while the illuminating readout beam 38 has a wavelength at a photon energy lesser than the bandgap energy of the photoconductor 84. The dichroic mirror 88 passes the photoactivating illumination beam 36 which then creates charge packets 37 in the photoconductor 84, which charge packets 37 then drift toward the MQW 34. This SLM operates in a reflective mode with the reflection means being the dichroic mirror 88 reflecting the modulated readout beam 40.

Referring to FIG. 12 which depicts an infrared-photoactivated reflective-mode hybrid longitudinal-field-mode NBRM SLM, an infrared photoactivating illuminating beam 90 illuminates an infrared imager array 92 typically made of a HgCdTe array onto which is integrably formed metal contact pads 32 with Indium bumps 30 extending therefrom. Metal contact pads 32b are integrably formed on top of a three to four micron N type doped GaAs epitaxial layer 93 conducting charged packets 37 through a N type doped GaAs grid 94. The grid 94 forms a low voltage bias serving to attract the charged packets 37 from the contact pads 32b towards the electrode 24 and serving to pixelize the charged packets 37.

The charged packets 37 conduct through a semiinsulating GaAs semiconductor 95 to Schottky contacts 28 upon which are disposed Indium bumps 30b extending to metal contact pads 32c. The contact pads 32c are integrably formed on a GaAs based MQW 34. The contact pads 32c serve as a reflector reflecting the illuminating readout beam 38. An imager array voltage source 20a having less than a one volt potential and connected between the image array 92 and the grid 94, biases the charge packets 37 drifting from the contact pads 32b toward the grid 94. The voltage source 20 again serves to bias the charge packets 37 drifting from the grid 94 to the electrode 24 and is preferably between twenty to fifty volts.

The infrared to visible converter can also be constructed semimonolithically by integrably forming epitaxial layer 93 and the semiconductor 95 to the GaAs MQW 34. A complete monolithic structure can be achieved by growing the HgCdTe infrared imager array 92 on the GaAs substrate comprising the epitaxial layer 93, semiconductor 95 and the MQW 34. In this later case, the metal grids 94 and the epitaxial layer 93 form an interface between the imager array 92 and the semiconductor 95.

Referring to FIG. 13 which depicts a photoactivated reflective-mode monolithic longitudinal-field-mode NBRM SLM, this NBRM SLM is one preferred embodiment of the present invention. This monolithic SLM comprises a high resistivity GaAs photoconductor 96 and a pixelized submicron metal mirror 97 disposed thereon. The GaAs MQW 34 in overgrown over the pixelized submicron metal mirror 97. This SLM further comprises electrodes 22 and 24 connected to the voltage source 20 again serving to establish the voltage potential gradient through the SLM.

Referring to FIGS. 13 and 14, the pixelized submicron metal mirror 97 has a basic pixelized grid pattern for pixelizing the charge packets 37. Within the grid pattern is a plurality of submicron lines 98 forming a sufficiently reflective surface even though the submicron lines 98 are not in electrical contact with the remaining grid pattern of the metal mirror 97.

From the foregoing description of the exemplar preferred embodiments of the present invention it should become apparent that there are many differing types of MQW based NBRM SLMs that can be fabricated whether they be hybrid or monolithic, transmissive or reflective electroabsorbers or electrorefractors, using longitudinal or traverse field mode, in inverse or forward modulation, all of which SLMs are operated using relatively small voltage sources compatible with semiconductor processes and which operate at low temperatures and provide excellent high resolutions based upon the steep near bandgap edge.

The herein disclosed SLMs can operate at very low temperatures approaching seventy degrees kelvin with frame rates of up to a gigahertz. The dynamic range of the SLMs is improved because of the lack of an electroabsorbing substrate and because of the enhanced level of modulation of the absorption coefficient or refractive index.

It should also be understood that the voltage sources herein disclosed were essentially DC. However, double Schottky contact barriers, or like means, can be used with an applied pulse width modulated AC voltage source. For example, referring to FIG. 4, a Schottky contact (not shown) could be disposed between the electrode 22 and the photoconductor 26 with the voltage source 20 being an AC biased or pulse width modulated reference. The advantages of AC operation might provide for the elimination of cumulative charge packets on various interface surfaces and may provide for more rapid conduction of charged packets through the SLM for further increased speed of operation.

Even though those skilled in the art may invent and conceive different MQW based NBRM SLM designs and modifications, those designs and modifications may nevertheless represent applications and principles within the spirit and scope of the present invention as defined by the following claims.

What is claimed is:

1. A spatial light modulator enabling near band gap modulation of a modulated readout beam, said spatial light modulator illuminated by a illuminating readout beam, said spatial light modulator connected to a voltage source for supplying a voltage potential gradient through said spatial light modulator, comprising:
    semiconductor driver means for forming spatial patterns of charge packets;
    multiple quantum wells having alternating layers in quantum proportion to the wavelength of confined electrons, said multiple quantum wells having modulated electrical fields therein respective to and induced by said charge packets serving to modulate said modulated readout beam, and
    contact means for high resistance impedance match and pixelization between said driver means and said multiple quantum wells.

2. The spatial light modulator of claim 1 further comprising reflective means for receiving said illuminating readout beam and for reflecting said modulated readout beam.

3. The spatial light modulator of claim 1 wherein said driver means is photoactivated photoconductor for receiving and transmitting a photoactivating illuminating beam which becomes said modulated readout beam.

4. The spatial light modulator of claim 1 further comprising grid means for pixelizing said charge packets.

5. The spatial light modulator of claim 1 wherein said contact means comprises contact pads disposed in a matrix pattern for pixelizing said charge packets.

6. The spatial light modulator of claim 1 further comprising grid means for creating transverse electric fields in said multiple quantum wells, said transverse electric fields extending from said charge packets to said grid means, said transverse fields for modulating said modulated readout beam.

7. The spatial light modulator of claim 1 further comprising metal mirror means abutting said multiple quantum wells for reflecting and pixelizing said illuminating readout beam.

8. A spatial light modulator enabling near band gap modulation of a reflected modulated readout beam, said spatial light modulator illuminated by an illuminating readout beam, said spatial light modulator connected to a voltage source for supplying a voltage potential gradient in said spatial light modulator, comprising
    a first electrode connected to said voltage source, said first electrode receiving and transmitting a photoactivating illuminating beam,
    a second electrode connected to said voltage source, said first and second electrode having said voltage potential gradient therebetween,
    a high resistivity photoconductor integrably formed with said first electrode at a distal end of said high resistivity photoconductor, said high resistivity photoconductor having spatial patterns of charge packets created therein dependent upon said photoactivating illuminating beam, a matrix of high impedance contacts integrably formed at a proximal end of said high resistivity photoconductor, a matrix of bumps respectively extending from said matrix of high impedance contacts for conducting said charge packets, a matrix of contact pads in respective electrical contact with said matrix of bumps, said matrix of contact pads serving to reflect said illuminating readout beam, multiple quantum wells integrably formed between said matrix of contact pads and said second electrode, said multiple quantum wells having alternating layers in quantum proportion to wavelength of confined electrons, said multiple quantum wells having modulated electrical fields therein respective to and induced by said charge packets modulating said reflected modulated readout beam.

9. A spatial light modulator enabling near band gap modulation of a reflected modulated readout beam, said spatial light modulator illuminated by an illuminating readout beam, said spatial light modulator connected to a voltage source for supplying a voltage potential gradient in said spatial light modulator, comprising a first electrode connected to said voltage source, said first electrode receiving and transmitting a photoactivating illuminating beam, a high resistivity photoconductor integrably formed with said first electrode at a distal end of said high resistivity photoconductor, said high resistivity photoconductor having spatial patterns of charge packets created therein dependent upon said photoactivating illuminating beam, a matrix of high impedance contacts integrably formed at a proximal end of said high resistivity photoconductor, a matrix of bumps respectively extending from said matrix of high impedance contacts for conducting said charge packets, a matrix of extending contact pads in respective electrical contact with said matrix of bumps, each of said matrix of extending contact pads having an extending end, a dielectric mirror of alternating compositional layer serving to reflect said illuminating readout beam, said dielectric mirror receiving said extending end of each of said matrix of extending contact pads, a metallic grid integrably formed with said dielectric mirror and connected to said voltage source, each of said extending ends separately surrounded by the metallic grid serving to provide transverse electric fields, and multiple quantum wells integrably formed with said metallic grid, said multiple quantum wells having alternating layers in quantum proportion to the wavelength of confined electrons, said multiple quantum wells biased by said transverse electrical fields modulated by said charge packets, said modulated transverse electrical fields modulating said reflected modulated readout beam.

10. The spatial light modulator of claim 10 wherein said multiple quantum wells comprise heterojunction cascaded layers.

11. The spatial light modulator of claim 10 further comprising, bump extended fused contacts extending into said multiple quantum wells from each of extending ends of said matrix of extending contact pads, and grid extended fused contacts extending into said multiple quantum wells from said metallic grid.

12. A spatial light modulator enabling near band gap modulation of a reflected modulated readout beam, said spatial light modulator illuminated by an illuminating readout beam, said spatial light modulator connected to a voltage source for supplying a voltage potential gradient in said spatial light modulator, comprising:

electrically addressed charge coupled device having a buried layer and having gates providing spatial patterns of charge packets in said buried layer, a grid connected to said voltage source and integrably formed with said buried layer, said grid for pixelizing said charge packet and for providing a bias voltage to said gates, an electrode connected to said voltage source, said electrode and said grid having a voltage gradient therebetween, a high resistivity semiconductor integrably formed with said grid at a distal end of said high resistivity semiconductor, said high resistivity photoconductor conducting said spatial patterns of charge packets therein, a matrix of high impedance contacts integrably formed at a proximal end of said high resistivity semiconductor, a matrix of bumps respectively extending from said matrix of high impedance contracts for conducting said charge packets, a matrix of contact pads in respective electrical contact with said matrix of bumps, said matrix of contact pads serving to reflect said illuminating readout beam forming said reflected modulated readout beam, and multiple quantum wells integrably formed between said matrix of contact pads and said electrode, said multiple quantum wells having alternating layers in quantum proportion to the wavelength of confined electrons, said multiple quantum wells having modulated electrical fields therein respective to and induced by said charge packets modulating said illuminating and reflected modulated readout beams.

13. A spatial light modulator enabling near bandgap modulation of an illuminating readout beam, said spatial light modulator illuminated by said illuminating readout beam, said spatial light modulator connected to a voltage source for supplying a voltage potential gradient in said spatial light modulator, comprising:

a substrate;

a pixelized submicron metal mirror epitaxially overgrown upon said substrate for reflecting said modulated illuminating readout beam;

multiple quantum wells integrably overgrown upon said submicron metal mirror, said multiple quantum wells having alternating layers in quantum proportion to the wavelength of confined electrons, said multiple quantum wells for modulating said illuminating readout beam; and an electrically addressed charge coupled device for receiving said illuminating readout beam and forming a spatial image of charge packets in response thereto for driving said multiple quantum wells.

14. A spatial light modulator enabling near band gap modulation of an illuminating readout beam in a transmissive mode said spatial light modulator connected to a voltage source for supplying a voltage potential gradient in said spatial light modulator, comprising:

a first electrode connected to said voltage source, said first electrode for receiving and transmitting a photoactivating illuminating beam and said illuminating readout beam;

a second electrode connected to said voltage source, said first and second electrode having said voltage potential gradient therebetween;

a high impedance Schottky contact integrably formed with said first electrode for providing a high resistance, a high resistivity photoconductor integrably formed with said high impedance Schottky contact at a distal end of said high resistivity photoconductor, said high resistivity photoconductor having spatial patterns of charge packets created therein in response to said photoactivating illuminating beam, said high resistivity photoconductor transmitting said illuminating readout beam, and multiple quantum wells integrably formed between a proximal end of said photoconductor and said second electrode, said multiple quantum wells having alternating layers in quantum proportion to the wavelength of confined electrons, said multiple quantum wells biased by electrical fields induced and modulated by said charge packets, said modulated electrical fields modulating the transmitted said illuminating readout beam.

15. A spatial light modulator enabling near band gap modulation of an illuminating readout beam, said spatial light modulator illuminated by a photoactivating illuminating beam, said spatial light modulator connected to a voltage source for supplying a voltage potential gradient in said spatial light modulator, comprising:

an electrode connected to said voltage source, said electrode receiving and transmitting said photoactivating illuminating beam and said illuminating readout beam, a metallic grid connected to said voltage source, said grid and said electrode having said voltage potential gradient therebetween, said metallic grid serving to create transverse electric fields, a high impedance Schottky contact integrably formed on said electrode for providing a high resistance, a high resistivity photoconductor integrably formed with said high impedance Schottky contact at a distal end of said high resistivity photoconductor, said high resistivity photoconductor having spatial patterns of charge packets created therein dependent upon said photoactivating illuminating beam, said high resistivity photoconductor transmitting said illuminating readout beam, and multiple quantum wells integrably formed between a proximal end of said photoconductor and said metallic grid, said multiple quantum wells having alternating layers in quantum proportion to the wavelength of confined electrons, said multiple quantum wells biased by said transverse electrical fields modulated by said charge packets, said modulated transverse electrical fields modulating the transmitted said illuminating readout beam.

16. A spatial light modulator enabling near band gap modulation, said spatial light modulator illuminated by an illuminating readout beam, said spatial light modulator connected to a voltage source for supplying a voltage potential gradient in said spatial light modulator, comprising:

a dichroic mirror for receiving and transmitting a photoactivating illuminating beam and for reflecting said illuminating readout beam, a first electrode connected to said voltage source, said first electrode integrably formed with said dichroic mirror, a second electrode connected to said voltage source, said first and second electrode having said voltage potential gradient therebetween, a high impedance Schottky contact integrably formed with said first electrode for providing a high resistance, a semiinsulating photoconductor integrably formed with said high impedance Schottky contact at a distal end thereof, said semiinsulating photoconductor conducting spatial patterns of charge packets created therein dependent upon said photoactivating illuminating beam, and multiple quantum wells integrably formed between a proximal end of said semiinsulating photoconductor and said second electrode, said multiple quantum wells having alternating layers in quantum proportion to the wavelength of confined electrons, said multiple quantum wells biased by electrical fields induced and modulated by said charge packets, said modulated electrical fields modulating said illuminating readout beam.

17. A spatial light modulator enabling near band gap modulation of a reflected modulated readout beam, said spatial light modulator illuminated by an illuminating readout beam, said spatial light modulator connected to a first and second voltage source for supplying a voltage potential gradient in said spatial light modulator, comprising an infrared imaging array biased by said first voltage source and for receiving an infrared photoactivating illumination beam, a first matrix of contact pads abutting said infrared imaging array for conducting spatial patterns of charge packets created by said infrared imaging array, a first matrix of bumps respectively connected to said first matrix of contact pads also for conducting said charge packets, a second matrix of contact pads abutting said first matrix of bumps also for conducting said charge packets, an epitaxial layer integrably formed with said second matrix of contact pads, a grid connected to said first and second voltage source and integrably formed with said epitaxial layer for pixelizing said charge packet, said infrared imaging array and said grid having a first portion of said voltage potential gradient therebetween, an electrode connected to said second voltage source, said grid and said electrode having a second portion of said voltage potential gradient therebetween, a semiinsulating semiconductor integrably formed with said grid at a distal end of said semiinsulating semiconductor, said semiinsulating semiconductor conducting said charge packets from said grid, a matrix of high impedance contacts integrably formed at a proximal end of said semiinsulating semiconductor, a second matrix of bumps respectively extending from said matrix of high impedance contacts for conducting said charge packets, a third matrix of contact pads in respective electrical contact with said second matrix of bumps, said third matrix of contact pads serving to reflect said illuminating readout beam, and multiple quantum wells integrably formed between said third matrix of contact pads and said electrode, said multiple quantum wells having alternating layers in quantum proportion to the wavelength of confined electrons, said multiple quantum wells having modulated electrical fields therein respective to and induced by said charge packets modulating said reflected modulated readout beam.

18. A spatial light modulator enabling near band gap modulation of a reflected modulated readout beam, said spatial light modulator illuminated by a illuminating readout beam, said spatial light modulator connected to a voltage source for supplying a voltage potential gradient in said spatial light modulator, comprising a first electrode connected to said voltage source, said first electrode receiving and transmitting a photoactivating illuminating beam, a second electrode connected to said voltage source, said first and second electrode having said voltage gradient therebetween, a high resistivity photoconductor integrably formed with said first electrode at a distal end of the high resistivity photoconductor, said high resistivity photoconductor having spatial patterns of charge packets created therein dependent upon said photoactivating illuminating beam, a pixelized submicron metal mirror integrably formed at a proximal end of said high resistivity photoconductor for reflecting said illuminating readout beam and for pixelizing said charge packets, and multiple quantum wells integrably formed between said pixelized submicron metal mirror and said second electrode, said multiple quantum wells having alternating layers in quantum proportion to the wavelength of confined electrons, said multiple quantum wells biased by electrical fields induced and modulated y said charge packets, said multiple quantum wells modulating said reflected modulated readout beam.

19. The spatial light modulator of claim 13 wherein The submicron metal mirror comprises:

a pixelized grid pattern for pixelizing said charge packets, and a plurality of submicron lines within each grid.

* * * * *